March 5, 1935.  C. B. PAUL  1,993,485
PORTABLE CAMERA SUPPORT
Filed July 24, 1934

Clifford B. Paul
INVENTOR
BY Victor J. Evans & Co.
ATTORNEY

Patented Mar. 5, 1935

1,993,485

UNITED STATES PATENT OFFICE 1,993,485

PORTABLE CAMERA SUPPORT

Clifford B. Paul, Moline, Ill.

Application July 24, 1934, Serial No. 736,731

4 Claims. (Cl. 95—86)

This invention relates to supports and has for the primary object the provision of a device especially adapted to provide a portable medium for a camera of the movie type whereby the camera may be efficiently supported to a person, permitting a person to operate the camera with the least strain on the arm and provide a device which is compact and readily applied and removed from either the camera or the person or permits the person to use the device when sitting or standing.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a view illustrating the application of my invention to a person and to a camera.

Figure 1:
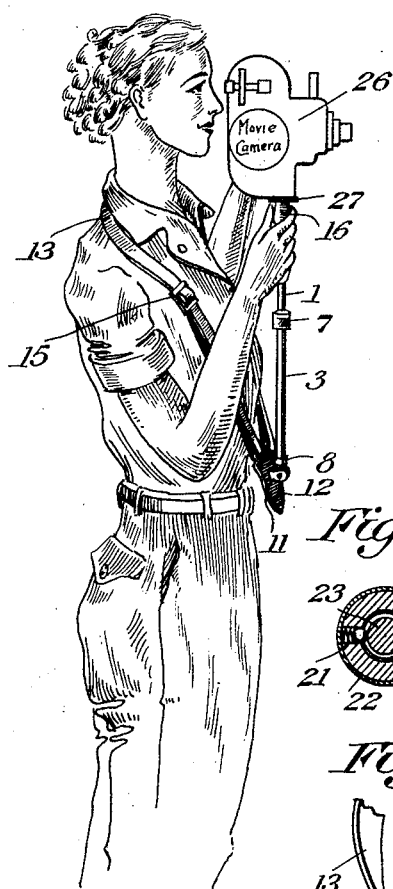
Figure 2:
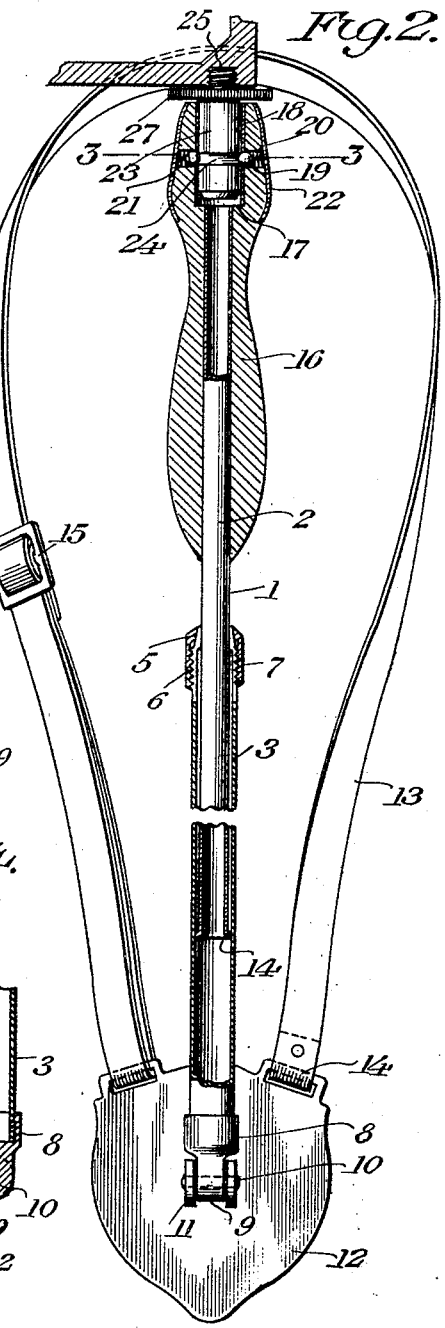
Figure 2 is a fragmentary vertical sectional view illustrating the support.
Figure 3:
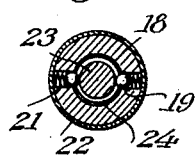
Figure 3 is a sectional view taken on the line 3—3 of Figure 2.
Figure 4:
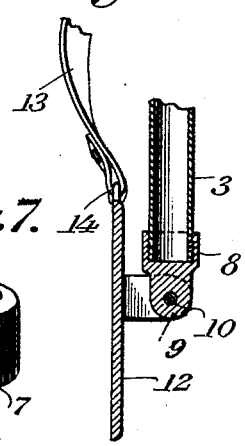
Figure 4 is a detail sectional view showing the connection between the telescopic standard or post and the sling attaching plate.
Figure 5:
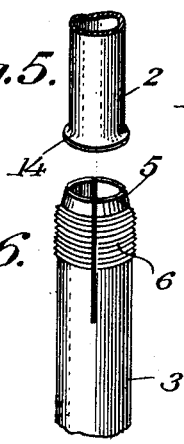
Figure 5 is a fragmentary perspective view illustrating the inner end of one of the sections of the post or standard.
Figure 6:
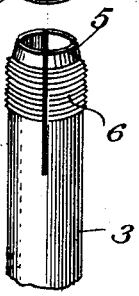
Figure 6 is a fragmentary perspective view illustrating the upper end of one of the sections of the standard or post.
Figure 7:
Figure 7 is a perspective view illustrating a clamping sleeve to cause one of the sections to grip the other section of the post or standard.

Referring in detail to the drawing, the numeral 1 indicates a standard or post consisting of telescopic sections 2 and 3. The inner end of the section 2 is flared, as shown at 4, to form a stop for limiting the movement of the section 2 out of the section 3. One end of the section 3 is bifurcated to form resilient jaws 5 externally screw threaded, as shown at 6. Threaded onto the jaws 5 is a knurled sleeve 7. The jaws taper, as shown in Figure 7, so that threading of the sleeve thereon causes a contraction of the jaws against the section 2 for holding the sections in adjusted relation. The other end of the section 3 has threaded thereto a cap 8 provided with an apertured reduced portion 9 to receive a pintle 10 carried by spaced ears 11 formed integrally with a sling plate 12 to which is connected a sling 13 consisting of an adjustable strap, one end of which is connected to the plate 12, as shown at 14, while the opposite end of the strap is passed through a slot of the plate and equipped with a suitable buckle whereby the sling may be adjusted to fit different sized persons.

The section 2 of the post or standard is secured into the bore of a handle 16. The bore is enlarged to form a chamber 17 in which a sleeve 18 is fitted. The sleeve is apertured to permit the balls 19 to project into the bore, the balls being mounted in openings 20 formed in the handle and are yieldably supported by springs 21 located in the openings 20 and held therein by a ferrule 22 fitting about the exterior of the handle which also acts to reinforce the handle. A stem 23 enters the chamber of the handle and has an annular groove 24 for the reception of the balls whereby the stem is removably and rotatably secured to the handle. The stem has a reduced screw threaded shank 25 adapted to be threaded in the tripod socket of a camera 26. A locking disc 27 is threaded on the stem 25 and may be turned tightly against the camera to lock the stem thereto. The camera is free to turn or rotate relative to the handle and due to the connection of the standard or post to the plate 12 when the sling is applied to the neck and shoulders of a person the camera may be tilted.

A device of the character described will permit a camera to be supported in alignment with the eyes of the user and to be turned and tilted as desired. The camera when applied to the person may be used either when the person is standing or sitting. The device can be readily adjusted both as to the sling 13 and the standard or post and the camera can be easily applied and removed from the handle and when the device is not in use the sections of the post or standard may be adjusted relative to one another so as to render a compactness to the device permitting it to be easily carried or stored in a small space.

Having described the invention, I claim:

1. A support comprising a standard adjustable as to length, a sling plate movably connected to one end of the standard, a sling connected to said plate, a handle mounted to the standard, and a fitting removably and rotatably connected to the handle and adapted for connection to a camera.

2. A support comprising a standard adjustable as to length, a sling plate movably connected to one end of the standard, a sling connected to said plate, a handle mounted to the standard, said handle having a chamber, a sleeve in said chamber and having apertures, spring pressed balls carried by the handle and protruding into the sleeve by way of said apertures, a stem received in the sleeve and having grooves to receive said balls for removably and rotatably connecting the stem to the handle, a reduced screw threaded shank on said stem for threaded connection with a camera.

3. A support comprising a standard adjustable as to length, a sling plate movably connected to one end of the standard, a sling connected to said plate, a handle mounted to the standard, said handle having a chamber, a sleeve in said chamber and having apertures, spring pressed balls carried by the handle and protruding into the sleeve by way of said apertures, a stem received in the sleeve and having grooves to receive said balls for removably and rotatably connecting the stem to the handle, a reduced screw threaded shank on said stem for threaded connection with a camera, a locking plate threaded to the shank and adapted to be turned against the camera, and a ferrule reinforcing the handle.

4. A support comprising an adjustable standard including telescopic sections and one of said sections having one end bifurcated and tapered to form resilient jaws externally screw threaded to grip the other section of the standard, said last-named section having its inner end flared, a knurled sleeve threaded to said jaws, a handle carried by the standard, means carried by the handle for rotatably and detachably connecting the camera to the handle, and a sling movably connected to the standard.

CLIFFORD B. PAUL.